(12) United States Patent  (10) Patent No.: US 8,724,292 B2
Taguchi et al.  (45) Date of Patent: May 13, 2014

(54) LITHIUM-ION CAPACITOR

(75) Inventors: Hiromoto Taguchi, Tokyo (JP); Shinichi Tasaki, Tokyo (JP); Nobuo Ando, Tokyo (JP); Mitsuru Nagai, Tokyo (JP); Yukinori Hatou, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 195 days.

(21) Appl. No.: 11/848,971

(22) Filed: Aug. 31, 2007

(65) Prior Publication Data

US 2008/0055819 A1  Mar. 6, 2008

(30) Foreign Application Priority Data

Sep. 4, 2006  (JP) ................. 2006-239560

(51) Int. Cl.
*H01G 9/155* (2006.01)
*H01G 9/00* (2006.01)

(52) U.S. Cl.
USPC .......................................... 361/502; 361/503

(58) Field of Classification Search
USPC ......................... 361/502–503, 505
See application file for complete search history.

(56) References Cited

U.S. PATENT DOCUMENTS

| | | | | |
|---|---|---|---|---|
| 5,277,729 | A | * | 1/1994 | Endo et al. ............... 156/157 |
| 5,464,453 | A | * | 11/1995 | Tong et al. ............... 29/25.03 |
| 5,711,988 | A | * | 1/1998 | Tsai et al. ................. 427/80 |
| 6,195,251 | B1 | * | 2/2001 | Suhara et al. .............. 361/502 |
| 6,246,568 | B1 | * | 6/2001 | Nakao et al. .............. 361/502 |
| 6,461,769 | B1 | | 10/2002 | Ando et al. |
| 7,548,409 | B2 | * | 6/2009 | Kojima et al. ............... 361/503 |
| 2004/0179328 | A1 | * | 9/2004 | Ando et al. ................ 361/504 |
| 2006/0126263 | A1 | * | 6/2006 | Tsunekawa et al. ....... 361/301.1 |

FOREIGN PATENT DOCUMENTS

| | | | |
|---|---|---|---|
| JP | 08-107048 | | 4/1996 |
| JP | 08097102 | A * | 4/1996 |
| JP | 09-055342 | | 2/1997 |
| JP | 09-232190 | | 9/1997 |
| JP | 11-297578 | A | 10/1999 |
| JP | 2004349306 | A * | 12/2004 |
| WO | 98/33227 | | 7/1998 |
| WO | WO 03003395 | A1 * | 1/2003 |
| WO | WO 2005096333 | A1 * | 10/2005 |

\* cited by examiner

*Primary Examiner* — Eric Thomas

(74) *Attorney, Agent, or Firm* — McDermott Will & Emery, LLP

(57) ABSTRACT

A lithium-ion capacitor excellent in durability, which has high energy density and high capacity retention ratio when the capacitor is charged and discharged at a high load, is disclosed. The lithium-ion capacitor includes a positive electrode, a negative electrode and an aprotic organic solvent of a lithium salt as an electrolyte solution. In the lithium-ion capacitor, a positive electrode active material allows lithium ions and/or anions to be doped thereinto and de-doped therefrom, and a negative electrode active material allows lithium ions to be doped thereinto and de-doped therefrom. At least one of the negative electrode and the positive electrode is pre-doped with lithium ions so that after the positive electrode and the negative electrode are shortcircuited, a potential of the positive electrode is 2 V (relative to Li/Li+) or lower. A thickness of a positive electrode layer of the positive electrode is within a range from 18 to 108 μm.

8 Claims, No Drawings

LITHIUM-ION CAPACITOR

CROSS-REFERENCE TO RELATED APPLICATIONS

The disclosure of Japanese Patent Application No. 2006-239560 filed on Sep. 4, 2006 including the specification, drawings and abstract is incorporated herein by reference in its entirety.

BACKGROUND OF THE INVENTION

1. Field of the Invention

The present invention relates to a lithium-ion capacitor including a positive electrode, a negative electrode and an aprotic organic solvent electrolytic solution of a lithium salt as an electrolytic solution.

The lithium-ion capacitor of the present invention is considerably effective when it is used for a driving source and an auxiliary electricity storage source in electric vehicles, hybrid electric vehicles and the like. The lithium-ion capacitor may also be used for driving electricity storage sources of power-assisted bicycles and powered wheel chairs, storage devices for storing various types of energies in solar power systems and wind power systems etc., and electricity storage sources for home-use electric appliances.

2. Description of the Related Art

A so-called lithium-ion secondary battery is known in which a carbon material such as graphite is used for a negative electrode and a lithium-containing metal oxide such as $LiCoO_2$ is used for a positive electrode. The lithium-ion secondary battery, which has a high capacity and is a prevailing electricity storage device, has practically been used primarily for main power sources of note personal computers and mobile phones. The lithium-ion secondary battery is a so-called rocking-chair type battery in which after the battery is assembled, the lithium-containing metal oxide of the positive electrode supplies lithium ions to the negative electrode by charging the battery, and when it is discharged, the lithium ions are returned from the negative electrode to the positive electrode. The lithium-ion secondary battery has the advantageous features of high voltage, high capacity and high safety.

In current circumstances of growing interest in environmental issues, the electricity storage devices (main power source and auxiliary power source) for the electric vehicles and the hybrid electric vehicles, which will supersede gasoline-powered vehicles, are vigorously developed. A lead battery has been used for the battery for the automobile. Recently, electrical systems and devices that are installed and assembled into the automobile have been functionally enhanced and increased in number. To secure satisfactory operations of them, it is required to increase the energy density and the output density. In this circumstance, the market demands new electricity storage devices so improved as to be able to produce such energy and output densities.

Attention has been given to the lithium ion secondary and electric double layer capacitor as such new electricity storage devices. The lithium-ion secondary battery is advantageous in that it has high energy density but is disadvantageous in that its output characteristics and safety are still uncertain and its cycle life is not long. The electric double layer capacitor, which is now used for memory backup power sources in IC and LSI, has a defect that its discharging capacity per charge is smaller than of the battery. However, the electric double layer capacitor has excellent features of high output characteristic and maintenance free, which are not possessed by the lithium-ion capacitor. The electric double layer capacitor is excellent in instantaneous charging/discharging characteristic and endures several tens thousands cycles of charging/discharging operations.

The electric double layer capacitor has the advantages just mentioned. However, the energy density of an ordinary electric double layer capacitor in the prior art is about 3 to 4 Wh/L, two orders of magnitude lower than the lithium-ion secondary battery. For use with the electric vehicles, it is said that 6 to 10 Wh/L is required for practical use, and 20 Wh/L is required for the spread of this storage device.

The new electricity storage device, also called a hybrid capacitor, has attract an attention as the electricity storage device satisfying the requirements of the high energy density and high output characteristic, in recent years. The hybrid capacitor is a combination of the lithium-ion secondary battery technology and the electricity storage principle of the electric double layer capacitor. In the common hybrid capacitor, a positive electrode is a polarizable electrode and a negative electrode is a nonpolarizable electrode. It has attracted an attention as the electricity storage device having the high energy density of the battery and high output characteristics of the electric double layer capacitor. There is a proposal of another hybrid capacitor in which a negative electrode capable of occluding and desorbing lithium ions is brought into contact with metal lithium to lower a potential of a negative electrode by chemically or electrochemically occluding or carrying (to be referred to also as "doping") lithium ions, whereby the withstand voltage is increased and the energy density is remarkably increased. The new technology is disclosed in JP-A-8-107048, 9-55342, 9-232190 and 11-297578, and International Publication WO98/033227.

This type of the hybrid capacitor is expected to have high performances, but it has the following problems. To dope the negative electrode with lithium ions, much time is needed. Further, it is difficult to uniformly dope the entire negative electrode with the lithium ions. It is generally understood that it is difficult to realize the hybrid capacitor in practical levels in large-capacity cells, such as a cylindrical device having wound electrodes and a square battery having a lamination of electrodes.

The problem was successfully solved. This successful technology follows. Through holes are formed in a negative electrode current collector and a positive electrode current collector, which constitute a cell, such that the through holes pass through those electrodes. Lithium ions are moved through the through holes, and at the same time, the metal lithium as a lithium ion supply source and the negative electrode are shortcircuited. By placing the metal lithium at the end of the cell, the negative electrode in the cell is entirely doped with the lithium ions (International Publication WO98/033227). Usually, the negative electrode is doped with lithium ions. However, the International Publication WO98/033227 describes that the same effect is produced when the negative electrode and the positive electrode are doped with lithium ions, and the positive electrode in lieu of the negative electrode is doped with lithium ions.

Thus, even in the large-capacity cells, such as the cylindrical device having wound electrodes and the square battery having a lamination of electrodes, the entire negative electrode of the device can be uniformly doped with the lithium ions for a short time. With the increased withstand voltage, the energy density of the capacitor is remarkably increased, realizing of the capacitors having high capacity and large output density originally possessed by the electric double layer capacitor is in sight.

To put the capacitor of high capacity in practical use, it is required to further increase the capacity, energy density, and output density, and to secure high durability.

SUMMARY OF THE INVENTION

The present invention has an object to provide a lithium-ion capacitor excellent in durability, having high energy density and high output density, and high capacity retention ratio when the capacitor is charged and discharged at a high load, in which a positive electrode active material allows lithium ions and/or anions to be doped thereinto and de-doped therefrom and a negative electrode active material allows lithium ions to be reversibly doped thereinto and de-doped therefrom, and at least one of the negative electrode and the positive electrode is pre-doped with lithium ions through electrochemical contact of the negative electrode and/or the positive electrode with metal lithium as a lithium ion supply source.

Vigorous efforts by the inventors successfully presented the following solution to the problems. In the lithium-ion capacitor, at least one of the negative electrode and the positive electrode is pre-doped with lithium ions so that after the positive electrode and the negative electrode are shortcircuited, potentials at the positive electrode and the negative electrode are each set to 2 V (relative to Li/Li+) or lower. In the positive electrode and the negative electrode, a thickness of a negative electrode layer does not offer any influence on the capacity properties. However, a thickness of a positive electrode layer has close relation with the energy density, output density and the capacity retention ratio when the capacitor is charged and discharged at a high load. The object mentioned above is achieved when the thickness of the positive electrode layer is selected to be within a range from 18 to 108 μm.

The present invention may be summarized as follows.

According to one aspect of the invention, there is provided a lithium-ion capacitor including a positive electrode, a negative electrode and an aprotic organic solvent electrolytic solution of a lithium salt as an electrolytic solution, wherein a positive electrode active material allows lithium ions and/or anions to be doped thereinto and de-doped therefrom and a negative electrode active material allows lithium ions to be doped thereinto and de-doped therefrom, at least one of the negative electrode and the positive electrode is pre-doped with lithium ions so that after the positive electrode and the negative electrode are shortcircuited, a potential of the positive electrode is 2 V (relative to Li/Li+) or lower, and a thickness of the positive electrode layer of the positive electrode is within a range from 18 to 108 μm (first conceptual feature).

In the lithium-ion capacitor (first conceptual feature), the weight of the positive electrode active material per unit area is 1.5 to 4.0 mg/cm² (second conceptual feature).

In the lithium-ion capacitor (first conceptual feature), at least one of the positive electrode and the negative electrode includes a current collector having through holes passing through the electrode to the front side and the reverse side of the electrode (third conceptual feature).

In the lithium-ion capacitor (third conceptual feature), at least one of the negative electrode and the positive electrode is pre-doped with lithium ions through electrochemical contact of the negative electrode and/or the positive electrode with a lithium ion supply source (fourth conceptual feature).

In the lithium-ion capacitor (first conceptual feature), the negative electrode active material has a capacitance per unit weight that is at least three times than that of the positive electrode active material, and the weight of the positive electrode active material is larger than that of the negative electrode active material (fifth conceptual feature).

In the lithium-ion capacitor (first conceptual feature), the positive electrode active material is a polyacene-based organic semiconductor having a polyacene-based skeleton structure which is an activated carbon or a heat-treated material of an aromatic condensed polymer and in which an atomic ratio of hydrogen atom/carbon atom is 0.50 to 0.05 (sixth conceptual feature).

In the lithium-ion capacitor (first conceptual feature), the positive electrode active material is an activated carbon (seventh conceptual feature). In the lithium-ion capacitor (first conceptual feature), the negative electrode active material is a polyacene-based organic semiconductor having a polyacene-based skeleton structure which is a graphite, a hard carbon or a heat-treated material of an aromatic condensed polymer and in which an atomic ratio of hydrogen atom/carbon atom is 0.50 to 0.05 (eighth conceptual feature).

In the lithium-ion capacitor (first conceptual feature), the negative electrode active material is a graphite (ninth conceptual feature).

In the lithium-ion capacitor (first conceptual feature), the negative electrode active material is a hard carbon (tenth conceptual feature).

The present invention provides a lithium-ion capacitor in which at least one of the negative electrode and the positive electrode is doped in advance with lithium ions, particularly a lithium-ion capacitor of large capacity, which has high energy density and high output density, high capacity retention ratio when the capacitor is charged and discharged at a high load, and excellent durability. We cannot present to date a clear theoretical explanation on the mechanism that in the lithium-ion capacitor of the invention in which at least one of the negative electrode and the positive electrode is doped in advance with lithium ions, the thickness of the positive electrode layer is controlled to be within a range from 18 to 108 μm, so that the output density as well as the energy density is increased, the capacity retention ratio is increased at a high load, and excellent durability is enhanced. It would be surmised as follows.

In the condition where the load is high, a voltage drop immediately after the discharging operation is small. The higher the capacitance in the high load condition is, the higher the capacity retention ratio is. Generally, the larger the load is, the sharper the inclination of the discharging curve is, and the capacitance becomes small. Thus, to enhance the output characteristics, it is essential to reduce the voltage drop by decreasing the DC resistance, and not to reduce the capacitance in the high load condition. In the lithium-ion capacitor of the invention, the diffusion resistance is small by controlling the thickness of the positive electrode layer to be within a range from 18 to 108 μm, so that the capacitance retention ratio becomes high in the high load condition. As a result, the capacity retention ratio becomes high.

DETAILED DESCRIPTION OF THE EMBODIMENTS

The term "dope" as used in the invention involves "occlude", "carry" or "insert", and specifically a phenomenon where lithium ions or anions enter a positive electrode active material or lithium ions enter a negative electrode active material. The term "de-dope" used herein involves "desorb", and specifically a phenomenon where lithium ions or anions desorb from a positive electrode active material or lithium ions desorb from a negative electrode active material.

The lithium-ion capacitor of the invention includes a positive electrode, a negative electrode and an aprotic organic solvent electrolytic solution of a lithium salt as an electrolytic solution. In the lithium-ion capacitor, a positive electrode active material is capable of reversibly carrying lithium ions and/or anions, and a negative electrode active material is capable of reversibly carrying lithium ions. The term "positive electrode" means the electrode from which current flows out when the lithium-ion capacitor is discharged, and the term "negative electrode" means the electrode to which current flows when the lithium-ion capacitor is charged.

In the lithium-ion capacitor of the invention, it is required to dope the negative electrode and/or the positive electrode with lithium ions so that after the positive electrode and the negative electrode are shortcircuited, a potential of the positive electrode is 2 V (relative to Li/Li+) or lower. When the negative electrode and/or positive electrode of the capacitor are not doped with lithium ions, the potentials at the positive electrode and the negative electrode are 3 V (relative to Li/Li+), and the potential of the positive electrode is 3 V after shortcircuiting between the positive electrode and the negative electrode.

In the invention, the wording "the potential of the positive electrode after shortcircuiting between the positive electrode and the negative electrode is 2 V or lower (relative to Li/Li+)" means that the potential of the positive electrode, which is obtained by either of the following methods (A) or (B), is 2 V (relative to Li/Li+) or lower. (A) After the doping of lithium ions, a positive electrode terminal and a negative electrode terminal of the capacitor are directly coupled together by means of a conductor. This state is left to stand for 12 hours or longer, and the shortcircuiting is removed. A potential of the positive electrode is measured within 0.5 to 1.5 hours after the removal of the shortcircuiting. (B) By using a charging/discharging tester, the capacitor is discharged to 0 V at constant current for 12 hours or longer. Then, a positive electrode terminal and a negative electrode terminal are coupled together by means of a conductor. In this state, the capacitor is left to stand for 12 hours or longer and the shortcircuiting of those electrodes is removed. A potential of the positive electrode is measured within a time range from 0.5 to 1.5 hours.

The wording, "the potential of the positive electrode after shortcircuiting between the positive electrode and the negative electrode is 2 V (relative to Li/Li+) or lower" does not only means the positive electrode potential immediately after the doping of lithium ions, but also the positive electrode potential after the shortcircuiting is 2 V (relative to Li/Li+) or lower in any of a charging state, a discharging state or after the charging and discharging operations are repeated.

The wording "the potential of the positive electrode after shortcircuiting between the positive electrode and the negative electrode is 2 V (relative to Li/Li+) or lower" will be described in detail hereunder. As described above, an activated carbon and a carbon material each have normally a potential of about 3 V (relative to Li/Li+). When a capacitor cell is constructed using an activated carbon for both positive and negative electrodes, the potentials of those electrodes are about 3 V. Therefore, if those electrodes are shortcircuited, the positive electrode potential remains at about 3 V. The same thing is true for a called hybrid capacitor in which an activated carbon is used for a positive electrode and a carbon material such as graphite or hard carbon, which is used by the lithium ion secondary capacitor, is used for a negative electrode. The potentials at those electrodes are each about 3 V (relative to Li/Li+). Accordingly, if those electrodes are shortcircuited, the positive electrode potential remains unchanged and at about 3 V (relative to Li/Li+). When the capacitor is charged, the potential of the negative electrode shifts to near 0 V (relative to Li/Li+) although it depends on the weight balance between the positive electrode and the negative electrode, and it is allowed to increase a charging voltage. Therefore, the hybrid capacitor produced has high voltage and high energy density. Generally, the upper limit of the charging voltage is determined by such a voltage as not to cause the dissolving of an electrolytic solution owing to increase of the positive electrode potential. When the positive electrode potential is set at the upper limit, the charging voltage may be increased by a potential drop of the negative electrode potential. In the case of the hybrid capacitor of which the positive electrode potential is about 3 V at the time of shortcircuiting, however, if the upper limit potential of the positive electrode is, for example, 4.0 V, the positive electrode potential is up to 3.0 V at the time of discharging, and a potential variation at the positive electrode is about 1.0 V. Accordingly, the capacity of the positive electrode is not fully utilized. Further, it is known that when lithium ions are inserted (charged) into and desorbed (discharged) from the negative electrode, the charging and discharging efficiencies in the initial stage are frequently low and the lithium ions, which are left while not being desorbed at the time of discharging, are present in the negative electrode. This is explained that those lithium ions are consumed for dissolving the electrolytic solution on the surface of the negative electrode and are trapped into a structure defect part of the carbon material. In this case, the charging/discharging efficiency at the negative electrode is lower than that at the positive electrode, and when those electrodes are shortcircuited after the charging/discharging operation is repeated, the potential of the positive electrode becomes higher than 3 V and the utilized capacity further decreases. Thus, if a voltage range that could be used is only between 4.0 V to 3.0 although the positive electrode is capable of utilizing from 4.0 V to 2.0 V in discharging, only the half of its fully utilized capacity is used, and the charging voltage becomes high but the capacity does not become high.

In order to secure high capacity and increased energy density in the hybrid capacitor in addition to high voltage and high energy density, it is required to increase the utilized capacity of the positive electrode.

If the positive electrode potential after the shortcircuiting decreases below 3.0 V (relative to Li/Li+), the utilized capacity is increased by the potential decrease and the capacity is increased. To secure the positive electrode potential of 2.0 V (relative to Li/Li+) or lower, it is preferable to charge lithium ions from the lithium ion supply source such as metal lithium to the negative electrode, in addition to the increasing of the amount of the lithium ions charged by the charging and discharging to and from the capacitor cell. The lithium ions are supplied to the capacitor cell from source other than the positive electrode and the negative electrode. Accordingly, when those electrodes are shortcircuited, an equilibrium potential of the metal lithium, the positive electrode and the negative electrode appears, and the potentials of the positive electrode and the negative electrode are both 3.0 V (relative to Li/Li+) or lower. The larger the amount of the metal lithium is, the lower the equilibrium potential is. If the materials of the negative electrode and the positive electrode are changed, the equilibrium potential changes. Accordingly, it is necessary to adjust the amount of the lithium ions to be doped into the negative electrode in accordance with the properties of the positive electrode material and the negative electrode material so that the potential of the positive electrode after the shortcircuiting is 2 V (relative to Li/Li+) or lower.

In the invention, at least one of the negative electrode and the positive electrode of the capacitor, for example, is doped with lithium ions in advance, and the potential of the positive electrode after the positive electrode and the negative electrode are shortcircuited is set to be 2 V (relative to Li/Li+) or lower, whereby the utilized capacity of the positive electrode is increased to provide high capacity and produce high energy density. As the doping amount of the lithium ions becomes larger, the potential of the positive electrode becomes lower when the positive electrode and the negative electrodes are shortcircuited, and the energy density of the capacitor cell becomes lower. To obtain further higher energy density, the potential of the positive electrode is preferably 1.5 V (relative to Li/Li+) or lower, particularly more preferably 1.0 V (relative to Li/Li+) or lower. Where the amount of lithium ions supplied to the positive electrode and/or the negative electrode is small, the positive electrode potential when the positive electrode and the negative electrode are shortcircuited is higher than 2 V (relative to Li/Li+) and the energy density of the capacitor cell becomes smaller. When the positive electrode potential decreases below 1.0 V (relative to Li/Li+), the following problems arise although depending on the positive electrode active material used, gas generates and the lithium ions are irreversibly consumed. As a result, it is difficult to measure the positive electrode potential. Where the positive electrode potential is too low, the negative electrode weight is too high. In this case, the energy density lowers. In general, it is 0.1 V (relative to Li/Li+) or higher, preferably 0.3 V (relative to Li/Li+) or higher.

In the invention, it suffices that the lithium ions are doped into one or both of the negative electrode and the positive electrode. For example, let us consider a case where an activated carbon is used for the positive electrode. When the doping amount of lithium ions is large and the positive electrode potential is low, problems sometimes arise. For example, the lithium ions are irreversibly consumed and the cell capacity lowers. Therefore, it is suggestible that in doping the negative electrode and the positive electrode with lithium ions, the electrode active material must be taken into consideration so as to avoid such problems. In the present invention, controlling of the doping amounts of the lithium ions into the positive electrode and the negative electrode makes the cell forming process complicated. To avoid this, the lithium ions are doped, preferably, into the negative electrode.

In constructing the lithium-ion capacitor of the invention, if the capacitance of the negative electrode active material per unit weight is more than three times as large as that of the positive electrode active material per unit weight, and the weight of the positive electrode active material is selected to be larger than that of the negative electrode active material, the capacitor of high voltage and high capacity is obtained. At the same time, where the negative electrode is used which has a large capacitance per unit weight relative to the capacitance of the positive electrode per unit weight, the weight of the negative electrode active material could be reduced without changing the potential variation of the negative electrode. Accordingly, in this case, the filling amount of the positive electrode active material is large, and the capacitance and the capacity of the resultant capacitor cell are large. It is preferable that the weight of the positive electrode active material is larger than that of the negative electrode active material. Preferably, the former is 1.1 to 10 times as large as the latter. In the case of less than 1.1 times, the capacity difference is small. In a case of larger than 10 times, the cell capacity is sometimes small. Further, in this case, the thickness difference between the positive electrode and the negative electrode is too large. This is not desirable in the cell construction.

In the present invention, the capacitance and the capacity of the capacitor cell (to be also referred simply to "cell") are defined as follows. The capacitance of the cell indicates an amount of electricity (inclination of the discharging curve), which flows through the cell per unit voltage of the cell, and the unit of the capacitance is F (farad). The capacitance of the cell per unit weight is expressed in terms of a ratio of the capacitance of the cell to the sum of the weights of the positive electrode active material and the negative electrode active material, which are charged in the cell, and the unit of it is F/g. The capacitance of the positive electrode or the negative electrode indicates an amount of electricity (inclination of the discharging curve), which flows through the cell per unit voltage of the positive electrode or the negative electrode, and the unit of the capacitance is F (farad). The capacitance of the cell per unit weight of the positive electrode or the negative electrode is expressed in terms of a ratio of the capacitance of the positive electrode or the negative electrode to the weight of the positive electrode active material or the negative electrode active material, which is charged in the cell, and the unit of it is F/g.

The cell capacity is a difference between the cell voltage at the time of starting the discharging operation and that at the time of ending the discharging operation, i.e., the product of a voltage change quantity and a capacitance of the cell, and the unit of the cell capacity is C (coulomb). 1 C is a quantity of charge when current of 1 A flows for 1 second, and in the invention it is converted and expressed in terms of mAh. The positive electrode capacity is a product of the capacitance of the positive electrode and a difference between the positive electrode potential at the time of starting the discharging operation and that at the time of ending the discharging operation (quantity of change of the positive electrode potential), and the unit of the positive electrode capacity is C or mAh. The negative electrode capacity is a product of the capacitance of the negative electrode and a difference between the negative electrode potential at the time of starting the discharging operation and that at the time of ending the discharging operation (quantity of change of the negative electrode potential), and the unit of the negative electrode capacity is C or mAh. The cell capacity, the positive electrode capacity and the negative electrode capacity are equal to each other.

In the invention, a "discharging start voltage" is a voltage after 100 msec. from a time point where the current starts to flow. Accordingly, a difference between the charging voltage of the cell (voltage immediately before the discharging current starts) and the discharging start voltage is a voltage drop at the time of discharging. The voltage drop is small when the current is small (low load), and is large when it is large (high load). Strictly, the discharging curve is not linear. In the invention, the capacitance of the cell takes a value that is calculated on the assumption that the discharging voltage linearly varies from the discharging start voltage to the discharging end voltage. The "capacitance retention ratio at a high load" means a rate of the capacitance at a high load to the capacitance at a low load. The term "capacity retention ratio at a high load" means a ratio of the capacity at a high load to the capacity at a low load. Generally, the electricity storage source has a resistance. Accordingly, since the voltage drop inevitably occurs at a high load, the capacity retention ratio is smaller than the capacitance retention ratio. In other words, the capacity retention ratio is affected by the voltage drop and the capacitance retention ratio.

In the lithium-ion capacitor of the invention, means for doping in advance the negative electrode and/or the positive electrode with lithium ions is not limited to specific one or ones in particular. A lithium ion supply source, for example, metal lithium, which is capable of supplying lithium ions may be located as a lithium electrode within the capacitor cell. It suffices that an amount of the lithium ion supply source (weight of metal lithium, for example) is capable of producing a predetermined capacity of the negative electrode. In this case, the negative electrode may be brought into physical contact (shortcircuited) with the lithium electrode or may be electrochemically doped with lithium ions. The lithium ion supply source may be formed on a lithium electrode current collector made of a conductive porous material. The conductive porous material, which is to be the lithium electrode current collector, may be a metal porous material which does not react with the lithium ion supply source, for example, a stainless mesh.

In a case of a large capacity capacitor cell having a multilayer structure, a positive electrode and a negative electrode are provided with a positive electrode current collector and a negative electrode current collector for feeding and receiving electricity, respectively. Where the positive electrode current collector and the negative electrode current collector are used and a lithium electrode is additionally provided, it is preferable that the lithium electrode is located at a position where it faces the negative electrode current collector, and lithium ions are electrochemically supplied to the negative electrode. In this case, a material having through holes passing through the material to the front and the reverse side of the material such as an expanded metal is preferably used for the positive electrode current collector and the negative electrode current collector, and the lithium electrode is located facing the negative electrode and/or the positive electrode. The form, the number and the like of the through holes are not particularly limited, and the through holes may be formed such that lithium ions in an electrolytic solution to be described later are movable from one side to the other side of the electrode via the through holes without interruption of the electrode current collectors.

In the lithium-ion capacitor of the invention, the lithium ions can be uniformly doped even when the lithium electrode for doping lithium ions into the negative electrode and/or the positive electrode is locally located in the cell. Accordingly, even in the large-capacity cell of the type in which the positive electrode and the negative electrode are layered or wound, the lithium electrode is located at apart of the outer most peripheral side cell or the outermost cell, whereby the lithium ions may be smoothly and uniformly doped into the negative electrode.

Various kinds of materials that are widely proposed in the lithium battery may be used for forming the electrode current collectors. Aluminum, stainless steel or the like may be used for the positive electrode current collector, and stainless steel, copper, nickel or the like may be used for the negative electrode current collector. The lithium ion supply source located in the cell is a material containing at least lithium elements and capable of supplying lithium ions, such as metal lithium or lithium-aluminum alloy.

The positive electrode active material in the lithium-ion capacitor of the invention is a material allowing lithium ions and/or anions such as tetrafluoroborate to be doped thereinto and de-doped therefrom. The positive electrode active material in the invention is preferably an activated carbon. A heat-treated material of an aromatic condensed polymer is also preferable, for example, a polyacene-based material (to be referred to also as PAS). The PAS is preferably formed by carbonizing and, if necessary, activating a phenol resin, followed by pulverization. The carbonizing process is carried out such that the phenol resin is placed in a heating furnace or the like, and heated for a required time at the temperature at which the phenol resin or the like is carbonized, as in the case of the activated carbon in the positive electrode. In the carbonizing process, the temperature is normally 500 to 1000° C. for the PAS, although it depends on the heating time or the like. For the pulverizing process, a known crusher such as a ball mill is used.

An particle diameter D50 (median diameter) of the activated carbon used as the positive electrode active material in the invention is preferably 2 to 8 μm, particularly preferably 3 to 8 μm. When the average particle diameter D50 is smaller than 2 μm, the capacity retention ratio is small. The reason for this is estimated such that the filling density of the positive electrode is too high, voids among the activated carbon particles are small in volume, and the electrolytic solution is easy to dry up. Conversely, when the average particle diameter D50 exceeds 8 μm, the filling density of the positive electrode is not increased to fail to form the electrode. Even if the electrode is formed, the energy density does not reach the targeted one. A value of the average particle diameter D50 in the invention is measured by a laser diffraction micro-track method, for example.

Examples of the raw materials of the activated carbon available in the invention include a phenol resin, petroleum pitch, petroleum coke, coconut shell, and carboniferous coke. Of those materials, the phenol resin or the carboniferous coke is preferable because it could have its high specific surface area. The raw materials of the activated carbon are calcinated and carbonized, and subjected to alkali activation treatment, followed by pulverization. The carbonizing process is carried out in such a manner that the raw material is placed in a heating furnace or the like, and heated at such a temperature as to be able to carbonize the raw material for a required time. The temperature at that time differs dependent on the kind of the raw material, the heating time and the like. When the heating time is about 1 to 20 hours, the temperature is usually set at 500 to 1000° C. A preferable atmosphere is an inactive gas such as a nitrogen gas or an argon gas.

In the present invention, the process for activating the activated carbon is not limited to a specific one or ones, but if it is treated with alkali, it has excellent properties. The alkali activation agent is preferably a salt or a hydroxide of an alkali metal such as lithium, sodium or potassium, more preferably potassium hydroxide. Examples of the alkali activation process include a process of mixing a carbide and an activation agent to heat the mixture in an inactive gas stream, a process of supporting an activation agent on an activated carbon raw material in advance and heating the resultant to carbonize and activate, and a process of activating a carbide by a gas activation process of steam or the like and to subject the activated carbide to a surface treatment using an alkali activation agent.

When a monovalent base such as potassium hydroxide is used for the alkali activation agent, the weight ratio of the carbide to the alkali activation agent is preferably within the range of 1:1 to 1:10, more preferably 1:1 to 1:5, and most preferably 1:2 to 1:4. When the ratio of the activation agent to the 1 part by weight of carbide is smaller than 1 part by weight, the activation process does not sufficiently progress. If it exceeds 4 parts by weight, on the other hand, the capacitance of the cell per unit volume may decrease.

The temperature for the alkali activation is preferably 400 to 900° C., more preferably around 600 to 800° C. If the activation temperature is lower than 400° C., the activation process does not progress and the capacitance of the cell is small. If it exceeds 900° C., the activation rate considerably reduces. This should be avoided. The activation time is preferably 1 to 10 hours, more preferably 1 to 5 hours. If the activation time is shorter than one hour, when it is used as the positive electrode, its internal resistance increases. If it exceeds 10 hours, the capacitance of the cell per unit volume decreases. After the activation process ends, much amount of the alkali activation agent contained must be removed by sufficient washing. In this case, the washing method is not particularly limited. Usually, it is necessary to sufficiently remove the alkaline component by repeating the acid washing using about 1 to 3 normal of hydrochloric acid at 80° C. several times. Further, it is sufficiently neutralized and washed by using ammonia water. The washed activated carbon that has been alkali activated is then pulverized.

For the pulverizing the activated carbon, a known crusher such as a ball mill is used. A laser diffraction micro-track method is used for obtaining the average particle diameter D50. The average pore diameter of the activated carbon is preferably 10 nm or less, and the specific surface area thereof is preferably 600 to 3000 $m^2/g$. As for the activated carbon as the positive electrode active material of the invention, its specific surface area is preferably 600 $m^2/g$ or more. If the specific surface area is smaller than 600 $m^2/g$, the volume of the activated carbon sometimes expands to be double at the time of the charging and discharging operation. In such a case, the capacity per unit volume lowers to fail to achieve the object of the invention. The specific surface area of the active material is preferably 800 $m^2/g$ or higher, more preferably 1300 to 2500 $m^2/g$.

The positive electrode in the invention is made of the positive electrode active material mentioned above. Its forming means is a known one. Specifically, a positive electrode active material powder, a binder and, if necessary, a conductive material and a thickening agent (carboxymethyl cellulose (CMC), etc.) are dispersed into an aqueous or organic solvent to obtain a slurry. The slurry is coated over the current collector, which is used if necessary, or the slurry is molded into a sheet in advance and the sheet is stuck onto the current collector. In the invention, it is essential to control a thickness of the positive electrode layer of the positive electrode within a range of 18 to 108 μm. When the thickness of the positive electrode layer is thinner than 18 μm, an energy density of the capacitor is small. Conversely when the positive electrode layer is thicker than 108 μm, the energy density of the capacitor is large but the capacity retention ratio at a high load lowers. In the invention, the thickness of the positive electrode layer is preferably 30 to 100 μm, more preferably 50 to 90 μm. In the invention, the thickness of the positive electrode layer is obtained by converting the result (per unit volume) of subtracting a volume of the current collector from that of the positive electrode into a thickness, and is given by the following equation:

Thickness of positive electrode layer=(positive electrode volume−current collector volume)/positive electrode area The current collector comes in two variations: a porous foil with through-holes such as the expanded metal and a non-porous foil such as an aluminum foil. The current collector volume can be obtained as the product of multiplying a thickness and the area of the current collector in the case of the non-porous foil. Where the positive electrode layer is contained in the through-holes as in the case of the porous foil, the current collector volume is obtained by subtracting the volume of the positive electrode layer contained in the through-holes from an apparent volume (obtained as the product of multiplying the thickness and the area of the current collector). It is preferable that the positive electrode layers of which the thicknesses are almost equal to each other are formed on both surfaces of the current collector. The formation of the positive electrode layers on both the surfaces of the current collector is not essential in the invention. The positive electrode layer may be formed on only one surface of the current collector. In this case, the thickness of the positive electrode layer is preferably within a range of 9 to 54 μm.

The weight of the positive electrode active material per unit area of the positive electrode is preferably controlled within a range from 1.5 to 4.0 $mg/cm^2$. If the weight of the positive electrode active material per unit area is smaller than 1.5 $mg/cm^2$, the energy density of the capacitor is small. Conversely if it is larger than 4.0 $mg/cm^2$, the energy density of the capacitor is large but the capacity retention ratio at a high load lowers. In the invention, the weight of the positive electrode active material per unit area is preferably 2.0 to 3.5 $mg/cm^2$, more preferably 2.5 to 3.2 $mg/cm^2$. The weight of the positive electrode active material per unit area is calculated by the following equation. In a both-side electrode where the positive electrode layers are formed on both surfaces of the current collector, the sum of the weights of the positive electrode active materials each per unit area on both the surfaces is the weight of the positive electrode active material. In a one-side electrode where the positive electrode layer is formed on only one surface of the current collector, the weight of the positive electrode active materials on one surface is the weight of the positive electrode active material.

Weight of positive electrode active material per unit area={(positive electrode weight−current collector weight)×active material ratio}/positive electrode area The term "active material ratio" means a ratio of the weight of the positive electrode active material to the total weight of the materials constituting the positive electrode layer, such as the positive electrode active material, binder, conductive material, and dispersion agent (except the current collector).

Examples of the binder used when the positive electrode is formed are a rubber-based binder such as SBR; a fluorine contained resin such as polyethylene tetrafluoride or polyvinylidene fluoride; a hydrocarbon resin such as polypropylene or polyethylene; and an acrylic polymer. Examples of the conductive material, which is used if necessary, include acetylene black, graphite, and metal powder. A preferable amount of the conductive material to be added is 1 to 40% of the positive electrode active material although it varies depending on an electric conductivity of the negative electrode active material, an electrode shape, and the like.

The negative electrode active material used in the invention is a material into and from which lithium ions may be doped and de-doped. Preferable examples of the material include a graphite, a hard carbon, and a heat-treated material of an aromatic condensed polymer, for example, a polyacene-based material.

Of the negative electrode active materials, the PAS is more preferable in that a high capacity is obtained. When the PAS having an atomic ratio of hydrogen atom/carbon atom (to be referred to as H/C) of about 0.22 is fed (charged) with lithium ions of 400 mAh/g and carries the ions, the PAS has a capacitance of 650 F/g or higher. When the PAS is charged with lithium ions of 500 mAh/g or larger, it has a capacitance of 750 F/g or more. The PAS has an amorphous structure, and the more the amount of lithium ions to be carried is increased, the more the potential lowers. Accordingly, the withstand voltage (charging voltage) of the capacitor becomes high. Further, an increasing rate (inclination of the discharging curve) of the voltage at the time of the discharging is low, and the capacity is somewhat large. Consequently, it is desirable to set the amount of lithium ions within a lithium ion storage ability of the active material in accordance with a required use voltage of a capacitor.

Since the PAS has an amorphous structure, it is free from such structural change as swell or contract when lithium ions are inserted and desorbed, so that is has an excellent cyclic characteristic. The PAS takes an isotropic molecular structure (higher-order structure) for the insertion and desorption of lithium ions, so that it has rapid charging and discharging characteristics. An aromatic condensed polymer as a precursor of the PAS is a condensation product of an aromatic hydrocarbon compound and aldehydes. Any of called phenols such as phenol, cresol, and xylenol may be preferably used for the aromatic hydrocarbon compound. Methylene bisphenols expressed by the following formula may be used:

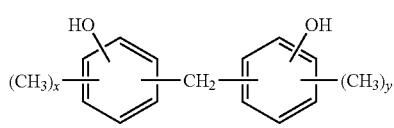

[Formula 1]

where x and y are each 0, 1 or 2.
Alternatively, hydroxy biphenyls or hydroxy naphthalenes may be used. Of those materials, the phenols are most preferable.

The aromatic condensed polymer may be a modified aromatic condensed polymer, e.g., a condensation product of phenol, xylene and formaldehyde, which is formed by substituting a part of the aromatic hydrocarbon compound having a phenolic hydroxyl group with an aromatic hydrocarbon compound having no phenolic hydroxyl group, such as xylene, toluene or aniline, for example. A modified aromatic condensed polymer substituted with melamine or urea may be used, and a furan resin is preferably used.

The PAS of the invention is manufactured in the following way. An insoluble and infusible base having an H/C of 0.5 to 0.05, preferably 0.35 to 0.10, is obtained by gradually heating the aromatic condensed polymer up to an appropriate temperature within a range from 400 to 800° C. under a non-acidic atmosphere (including vacuum). Also when the insoluble and infusible base is gradually heated up to an appropriate temperature within a range from 350 to 800° C., preferably 400 to 750° C., under a non-acidic atmosphere (including vacuum), the insoluble and infusible base of which the H/C is within the range can be obtained.

The insoluble and infusible base has an X-ray diffraction (CuKα) main peak at 24° or smaller in terms of 2θ, and in addition to the main peak, another broad peak appears at an angular position within a range from 41 to 46°. The insoluble and infusible base has a polyacene-based skeleton structure into which an aromatic polycyclic structure appropriately grows, and has an amorphous structure, to thereby ensure stable doping of lithium ions.

In the invention, the grain characteristic of the negative electrode active material of the invention is defined by the negative electrode active material particles of which the D50 is 0.5 to 30 μm, is preferably 0.5 to 15 μm, more preferably 0.5 to 6 μm. The specific surface area of the negative electrode active material particles of the invention is preferably 0.1 to 2000 m²/g, more preferably 0.1 to 1000 m²/g, most preferably 0.1 to 600 m²/g.

The negative electrode in the invention is made of the negative electrode active material powder mentioned above. Its forming means is a known one as in the case of the positive electrode. Specifically, a negative electrode active material powder, a binder and, if necessary, a conductive material and a thickening agent (e.g., CMC) are dispersed into an aqueous or organic solvent to obtain a slurry. The slurry is coated over the current collector or the slurry is molded into a sheet in advance and the sheet may be stuck onto the current collector. Examples of the binder used when the negative electrode is formed include a rubber-based binder such as SBR; a fluorine contained resin such as polyethylene tetrafluoride or polyvinylidene fluoride; a thermoplastic resin such as polypropylene or polyethylene; and an acrylic polymer. In the case where the polyethylene tetrafluoride is used, it reacts with lithium ions when the potential of the negative electrode lowers. To avoid this, it is necessary to select the electrode potential to be a potential at which it does not react with lithium ions. A preferable amount of the binder to be added is 2 to 40% by weight of the negative electrode active material although it varies depending on an electric conductivity of the negative electrode active material, an electrode shape, and the like.

In the invention, the weight of the active material per unit area of the negative electrode, as mentioned above, does not greatly affect the characteristics of the resultant capacitor, unlike that in the positive electrode. The weight of the negative electrode active material is preferably 1.0 to 4.5 mg/cm², more preferably 2.0 to 3.5 mg/cm², when allowing for the durability and the energy density of the capacitor. It depends also on the weight of the active material per unit area of the positive electrode as the counter electrode of the negative electrode. When the weight of the positive electrode active material per unit area is made larger than that of the negative electrode active material per unit area, the energy density of the resultant capacitor is high. When the weight of the negative electrode active material per unit area is smaller than 1.0 mg/cm², the energy density of the capacitor is high but the durability thereof decreases. Conversely, when it is larger than 4.5 mg/cm², the energy density of the capacitor decreases.

Examples of the aprotic organic solvent forming the aprotic organic solvent electrolytic solution in the lithium-ion capacitor of the invention include ethylene carbonate, propylene carbonate, dimethyl carbonate, diethyl carbonate, methyl ethyl carbonate, γ-butyrolactone, acetonitrile, dimethoxyethane, tetrahydrofulan, dioxolan, methylene chloride, and sulfolane. In addition, a mixed solution having at least two types of these aprotic organic solvents can be used.

The electrolyte dissolved in the single or mixed solvent may be any type of electrolytes as long as it is able to generate lithium ions. Examples of such a type of electrolyte include $LiClO_4$, $LiAsF_6$, $LiBF_4$, $LiPF_6$, $LiN(C_2F_5SO_2)_2$, $LiN(CF_3SO_2)_2$, etc. The electrolyte and the solvent, after sufficiently dehydrated, are mixed into an electrolytic solution. A concentration of the electrolyte in the electrolytic solution is preferably at least 0.1 mol/L, more preferably within a range from 0.5 to 1.5 mol/L, in order to reduce the internal resistance of the electrolytic solution.

The lithium-ion capacitor of the invention is suitable for a capacitor cell of a large capacity, such as a wound-type cell in which strip-like positive and negative electrodes are wound with a separator interposed between them, a lamination-type cell in which plate-like positive negative electrodes are laminated with a separator interposed between them at least three layers, and a film-type cell in which a lamination is sealed in an outer jacket film, the lamination being configured such that plate-like positive negative electrodes are laminated with a separator interposed between them at least three layers. Those types of the capacitor cells are known, for example, in International Publication WO00/07255 and WO03/003395, and JP-A-2004-266091. The capacitor cell of the invention may take the form of any of those types of known capacitor cells.

EXAMPLES

The present invention will be described in more details by using examples. It should be understood that the invention is not limited to the examples to be described hereunder.

Example 1

Method of Manufacturing Negative Electrode 1

A phenol resin molding plate of 0.5 mm thick was placed in a Siliconit electric furnace and heat-treated under a nitrogen atmosphere at a rate of 50° C./hour till temperature reached 500° C., and further heat-treated at the rate of 10° C./hour till temperature reached 700° C., whereby a PAS plate was synthesized. The PAS plate thus obtained was pulverized with a disc mill to obtain PAS powder. The PAS powder had a H/C ratio of 0.17.

Then, 100 parts by weight of the above PAS powder and a solution formed by dissolving 10 parts by weight of polyvinylidene fluoride powder in 80 parts by weight of N-methyl pyrrolidone were sufficiently mixed to obtain a slurry. The slurry was coated uniformly over both surfaces of a copper expanded metal (manufactured by Nippon Metal Industry Co., Ltd.) having a thickness of 32 μm (porosity of 50%) by a die coater, and dried and pressed, whereby an negative electrode 1 was produced of which the weight of the resultant negative electrode active material per unit area was 4.0 mg/cm$^2$.
(Measurement of Capacitance Per Unit Weight of Negative Electrode 1)

One sheet was cut out so that the area of the negative electrode 1 had a size of 1.5×2.0 cm$^2$, and it was used as a negative electrode to be evaluated. A test cell was assembled in such a manner that metal lithium plates each having a size of 1.5×2.0 cm$^2$ and a thickness of 200 μm were used as the counter electrodes for the negative electrode, and located on both sides of the negative electrode 1 with a polyethylene nonwoven fabric separators having a thickness of 50 μm being interposed between the counter electrodes and the negative electrode. Metal lithium was used as a reference electrode. As an electrolytic solution, a solution having LiPF$_6$ dissolved at a concentration of 1.2 mol/L in propylene carbonate was used.

Lithium ions were charged in amount of 620 mAh/g based on the negative electrode active material weight at the charging current of 1 mA, and then it was discharged at the current 1 mA to 1.5 V. A capacitance per unit weight of the negative electrode 1 was estimated to be 1021 F/g from a discharging time during that the potential of the negative electrode changed by 0.2 V, from the potential after one minute elapses from the start of the discharging operation.
(Method for Manufacturing Positive Electrode 1)

A slurry was obtained by thoroughly mixing 85 parts by weight of commercially available activated carbon powder having the specific surface area of 2000 m$^2$/g, 5 parts by weight of acetylene black powder, 6 parts by weight of acrylic resin binder, 4 parts by weight of carboxymethyl cellulose, and 200 parts by weight of water.

Both surfaces of an aluminum expandable metal (manufactured by Nippon Metal Industry Co., Ltd.) having a thickness of 35 μm (porosity of 50%) was coated with a non-aqueous carbon conductive coating (EB-815, manufactured by Acheson (Japan) Limited) by a spraying method, and dried thereby to obtain a current collector for a positive electrode having a conductive layer thereon. The total thickness (the sum of the current collector thickness and the conductive layer thickness) was 52 μm, and most of the through-holes of the positive electrode current collector were filled with the conductive coating. The slurry was uniformly applied over both surfaces of the positive electrode current collector by means of a roll coater, and dried and pressed to produce a positive electrode 1 having a thickness of 129 μm. A thickness of the positive electrode layer of the positive electrode 1 was 77 μm, and the weight of the positive electrode active material per unit area was 3.5 mg/cm$^2$.
(Measurement of Capacitance Per Unit Weight of Positive Electrode 1)

One sheet was cut out so that the area of the positive electrode 1 had a size of 1.5×2.0 cm$^2$, and it was used for a positive electrode to be evaluated. A test cell was assembled in such a manner that metal lithium plates each having a size of 1.5×2.0 cm$^2$ and a thickness of 200 μm were used as the counter electrodes for the positive electrode, and located on both sides of the positive electrode 1 with a polyethylene nonwoven fabric separators having a thickness of 50 μm being interposed between the counter electrodes and the positive electrode. Metal lithium was used as a reference electrode. As an electrolytic solution, a solution having 1.2 mol/LLiPF$_6$ dissolved in propylene carbonate was used.

Charging to 3.6V at a charging current of 1 mA was carried out and then constant voltage charge was carried out, and after a total charging time of 1 hour, discharging was carried out to 2.5V at 1 mA. A capacitance per unit weight of the positive electrode 1 was obtained from a discharging time between 3.5 V and 2.5 V, and it was 140 F/g.
(Manufacturing of Electrode Lamination Structure 1)

The negative electrode 1 was cut out to have an area of 6.0×7.5 cm$^2$ (except the terminal welding parts), and the positive electrode 1 was cut out to have an area of 5.8×7.3 cm$^2$ (except the terminal welding parts). A cellulose/rayon nonwoven fabric of 35 μm thick was used as a separator. The electrode were laminated in a manner that the terminal welding parts of the positive electrode current collectors and the negative electrode current collectors were set in the opposite side, the number of a layer where the positive electrode and the negative electrode faced each other was 20, and the outermost electrodes of the laminated electrodes were the negative electrodes. The separators were located on the uppermost side and lowermost side of the lamination structure, and the four sides of the structure were fastened with a tape. The terminal welding parts (ten sheets) of the positive electrode current collectors and the terminal welding parts (eleven sheets) of the negative electrode current collectors were ultrasonically welded respectively to an aluminum positive electrode terminal and a copper negative electrode terminal, thereby to obtain an electrode lamination structure 1. The positive electrode and the negative electrode terminals had each a size of 50 mm wide, 50 mm long and 0.2 mm thick. 10 sheets of the positive electrodes and 11 sheets of the negative electrodes were used. Although the weight of the positive electrode active material is 0.8 times as heavy as that of the negative electrode active material, the former is 0.9 times as heavy as the weight of the negative electrode active material contained within the area of the negative electrode facing the positive electrode. The positive electrode area is 94% of the negative electrode area.
(Manufacturing of Cell 1)

The lithium electrode was formed by pressing a metal lithium foil (thickness was 122 μm, the areal size was 6.0×7.5 cm$^2$, and the amount was equivalent to 300 mA/g) onto a stainless steel mesh of 80 μm thick. A lithium electrode was located on the upper part of the electrode lamination unit such that it exactly faces the uppermost negative electrode, and another lithium electrode was located on the lower part thereof in the same fashion, whereby a three-electrode lamination unit was manufactured. The terminal welding parts (two sheets) of the lithium electrode current collector were resistance-welded to the negative electrode terminal welding parts.

The three-electrode lamination unit was placed in an outer jacket film deep-drawn by 7.5 mm, and covered with an outer laminate film and three sides were heatsealed. Then, the unit was vacuum-impregnated with a solution (solution formed by dissolving $LiPF_6$ at 1 mol/L into a solvent mixture containing ethylene carbonate, diethyl carbonate and propylene carbonate at the weight ratio of 3:4:1). Then, the remaining one side of the unit was heat sealed to assemble four cells of the film type capacitors. The metal lithium located in each cell was equivalent to 600 mAh/g per the negative electrode active material weight.

(Initial Evaluation of Cell)

The thus assembled cells were left to stand for 20 days, and one cell was disassembled. It was confirmed that no metal lithium remained. From this fact, it was considered that the amount of lithium ion, which was necessary for producing a capacitance not less than 1021 F/g per unit weight of the negative electrode active material, was pre-doped through the charging operation. A capacitance of the negative electrode per unit weight was 7.3 times as large as that of the positive electrode per unit weight.

(Characteristic Evaluation of Cell)

The cell was charged at a constant current of 1.5 A till the cell voltage reached 3.8 V, and then was charged for one hour by a constant current-constant voltage charging method in which a constant voltage of 3.8 V was applied. Then, the cell was discharged at a constant current of 1.5 A till the cell voltage reached 2.2 V. The cycle of the charging operation to 3.8 V and the discharging operation to 2.2 V was repeated, and when the cycle was repeated 10 times, the capacitance and the energy density of the cell were evaluated. Subsequently, the cell was charged in a similar way, and was discharged at a constant current of 60 A till the cell voltage reached 2.2 V. The cell capacitance and its ratio to the capacitance estimated at 1.5 A were evaluated. The results of the evaluation are shown in Table 1. Numerical data in the table are the average values of three cells.

TABLE 1

|  | Cell No. | Capacitance (F) | Energy density (Wh/L) | Capacitance (F) | Capacitance ratio (%) |
|---|---|---|---|---|---|
| Example 1 | Cell 1 | 369 | 12.7 | 318 | 86.2 |

After the measurement ended, the positive electrode and the negative electrode of one cell were shortcircuited and a potential of the positive electrode was measured. The result was about 0.95 V, below 2 V. The capacitor could be produced which had high energy density and high capacitance retention ratio when the cell was discharged at a high load by pre-doping the negative electrode and/or the positive electrode with lithium ion so that when the positive electrode and the negative electrode were shortcircuited, the potential of the positive electrode was 2 V or lower.

Examples 2 to 5

After the pressing step, four cells (cell 2, cell 3, cell 4, and cell 5) of the film type capacitors were assembled in the same manner as in Example 1 except that the following positive electrodes 2 to 5 were used.

Positive Electrode 2:
Positive electrode layer thickness=34 μm
Weight of the positive electrode active material per unit area=1.5 mg/cm²

Positive Electrode 3:
Positive electrode layer thickness=55 μm
Weight of the positive electrode active material per unit area=2.5 mg/cm²

Positive Electrode 4:
Positive electrode layer thickness=65 μm
Weight of the positive electrode active material per unit area=3.0 mg/cm²

Positive Electrode 5:
Positive electrode layer thickness=90 μm
Weight of the positive electrode active material per unit area=4.0 mg/cm²

The metal lithium located in each cell was equivalent to 600 mAh/g per the weight of the negative electrode active material.

(Initial Evaluation of Cell)

The thus assembled cells were left out for 20 days, and one cell was disassembled. It was confirmed that no metal lithium was found. From this fact, it was considered that the amount of lithium ion, which was necessary for producing an electrostatic capacitance not less than 1021 F/g per unit weight of the negative electrode active material, was pre-doped through the charging operation.

(Characteristic Evaluation of Cell)

The cell was charged at a constant current of 1.5 A till the cell voltage reached 3.8 V, and then was charged for one hour by a constant current-constant voltage charging method in which a constant voltage of 3.8 V was applied. Then, the cell was discharged at a constant current of 1.5 A till the cell voltage reached 2.2 V. The cycle of the charging to 3.8 V and the discharging to 2.2 V was repeated, and when the cycle was repeated 10 times, the capacitance and the energy density of each cell were evaluated. Subsequently, the cell was charged in a similar way, and was discharged at a constant current of 60 A till the cell voltage reached 2.2 V. The cell capacitance and its ratio to the capacitance estimated 1.5 A were evaluated. The results of the evaluation are shown in Table 2. Numerical data in the table are the average values of three cells.

As seen from Table 2, the capacitance retention rate of each cell when the cell is discharged at high load is high.

TABLE 2

|  | Cell No. | Capacitance (F) | Energy density (Wh/L) | Capacitance (F) | Capacitance ratio (%) |
|---|---|---|---|---|---|
| Example 2 | Cell 2 | 169 | 6.6 | 152 | 89.9 |
| Example 3 | Cell 3 | 271 | 10.0 | 239 | 88.1 |
| Example 4 | Cell 4 | 325 | 11.4 | 284 | 87.5 |
| Example 5 | Cell 5 | 416 | 13.9 | 354 | 85.0 |

After the measurement ended, the positive electrode and the negative electrode of one cell were shortcircuited and a potential of the positive electrode was measured. The result was about 0.95 V, below 2.0 V. The capacitor could be produced which had high energy density when the cell was discharged at high load by carrying the lithium ions on the negative electrode and/or the positive electrode in advance so that when the positive electrode and the negative electrode were shortcircuited, the potential of the positive electrode was 2.0 V or lower. The energy density of the capacitor was high when the capacitance per unit weight of the negative electrode active material was at least three times as large as that per unit weight of the positive electrode active material, and when the weight of the positive electrode active material was larger than that of the negative electrode active material.

Comparative Examples 1 to 4

Four cells (cell 6, cell 7, cell 8, and cell 9) of the film type capacitors were each assembled in the same manner as in Example 1 except that after the pressing step, the following positive electrodes 6 to 9 were used.
Positive Electrode 6:
Positive electrode layer thickness=11 μm
Weight of the positive electrode active material per unit area=0.5 mg/cm$^2$
Positive Electrode 7:
Positive electrode layer thickness=23 μm
Weight of the positive electrode active material per unit area=1.0 mg/cm$^2$
Positive Electrode 8:
Positive electrode layer thickness=121 μm
Weight of the positive electrode active material per unit area=5.5 mg/cm$^2$
Positive Electrode 9:
Positive electrode layer thickness=142 μm
Weight of the positive electrode active material per unit area=6.5 mg/cm$^2$
The metal lithium located in each cell was equivalent to 600 mAh/g per the weight of the negative electrode active material.
(Initial Evaluation of Cell)
The thus assembled cells were left to stand for 20 days, and one cell was disassembled. It was confirmed that no metal lithium was remained. From this fact, it was considered that the amount of lithium ion, which was necessary for producing a capacitance not less than 1021 F/g per unit weight of the negative electrode active material, was doped.
(Characteristic Evaluation of Cell)
The cell was charged at a constant current of 1.5 A till the cell voltage reached 3.8 V, and then was charged for one hour by a constant current-constant voltage charging method in which a constant voltage of 3.8 V was applied. Then, the cell was discharged at a constant current of 1.5 A till the cell voltage reached 2.2 V. The cycle of the charging operation to 3.8 V and the discharging operation to 2.2 V was repeated, and when the cycle was repeated 10 times, the capacitance and the energy density of each cell were evaluated. Subsequently, the cell was charged in a similar way, and was discharged at a constant current of 60 A till the cell voltage reached 2.2 V. The cell capacitance and its ratio to the capacitance estimated at 1.5 A were evaluated. The results of the evaluation are shown in Table 3. Numerical data in the table are the average values of three cells.

TABLE 3

| | Cell No. | Capacitance (F) | Energy density (Wh/L) | Capacitance (F) | Capacitance ratio (%) |
|---|---|---|---|---|---|
| Comparative Example 1 | Cell 6 | 58 | 2.4 | 53 | 91.0 |
| Comparative Example 2 | Cell 7 | 116 | 4.6 | 105 | 90.5 |
| Comparative Example 3 | Cell 8 | 552 | 16.8 | 439 | 79.6 |
| Comparative Example 4 | Cell 9 | 628 | 18.4 | 473 | 75.3 |

In the cells of Comparative Examples 1 and 2, the capacitance retention ratio when the cell is discharged at the high load is high, but the energy density is low, 5.0 Wh/L or lower. In the cells of Comparative Examples 3 and 4, the capacitance retention ratio when the cell is discharged at a high load is low.

Examples 6 to 8

Each four cells (cell 10, cell 11, and cell 12) of the film capacitors were assembled in the same manner as in Example 1 except that after the pressing step, the following negative electrodes 2 to 4 were used.
Negative Electrode 2:
Weight of the negative electrode active material per unit area=2.5 mg/cm$^2$
Negative Electrode 3:
Weight of the negative electrode active material per unit area=3.5 mg/cm$^2$
Negative Electrode 4:
Weight of the negative electrode active material per unit area=5.5 mg/cm$^2$
A thickness of the metal lithium located in each cell was adjusted so that the metal lithium was equivalent to 600 mAh/g per the weight of the negative electrode active material.
(Initial Evaluation of Cell)
The thus assembled cells were left to stand for 20 days, and one cell was disassembled. It was confirmed that no metal lithium was remained. From this fact, it was considered that the amount of lithium ion, which was necessary for producing a capacitance not less than 1021 F/g per unit weight of the negative electrode active material, was doped.
(Characteristic Evaluation of Cell)
The cell was charged at a constant current of 1.5 A till the cell voltage reached 3.8 V, and then was charged for one hour by a constant current-constant voltage charging method in which a constant voltage of 3.8 V was applied. Then, the cell was discharged at a constant current of 1.5 A till the cell voltage reached 2.2 V. The cycle of the charging operation to 3.8 V and the discharging operation to 2.2 V was repeated, and when the cycle was repeated 10 times, the capacitance and the energy density of each cell were evaluated. Subsequently, the cell was charged in a similar way, and was discharged at a constant current of 60 A till the cell voltage reached 2.2 V. The cell capacitance and its ratio to the capacitance estimated at 1.5 A were evaluated. The results of the evaluation are shown in Table 4. Numerical data in the table are the average values of three cells.

TABLE 4

|  | Cell No. | Capacitance (F) | Energy density (Wh/L) | Capacitance (F) | Capacitance ratio (%) |
|---|---|---|---|---|---|
| Example 6 | Cell 10 | 349 | 13.0 | 297 | 85.1 |
| Example 7 | Cell 11 | 366 | 12.9 | 314 | 85.9 |
| Example 8 | Cell 12 | 381 | 12.1 | 333 | 87.5 |

In the cells of Examples 6 to 8, each cell of which the positive electrode layer was 77 μm thick (weight of the positive electrode active material per unit area=3.5 mg/cm$^2$) exhibited a high capacitance retention ratio when the cell was discharged at the high load, independently of the weight of the negative electrode active material per unit area.

After the measurement ended, the positive electrode and the negative electrode of one cell were shortcircuited and a potential of the positive electrode was measured. The result was about 0.95 V, and below 2 V. The capacitor could be produced which had high energy density when the cell was discharged at a high load by pre-doping the lithium ion into the negative electrode and/or the positive electrode so that when the positive electrode and the negative electrode were shortcircuited, the potential of the positive electrode was 2 V or lower. The energy density of the capacitor was high when the capacitance per unit weight of the negative electrode active material was at least three times as large as that per unit weight of the positive electrode active material, and when the weight of the positive electrode active material was larger than that of the negative electrode active material.

Comparative Examples 5 to 7

Each four cells (cell 13, cell 14, and cell 15) of the film type capacitors were assembled in the same manner as in Comparative Example 3 of the positive electrode 8 of which the positive electrode layer had a thickness of 121 μm (weight of the positive electrode active material per unit area=5.5 mg/cm$^2$) except that after the pressing step, the following negative electrodes 2, 3 and 5 were used.

Negative Electrode 2:
Weight of the negative electrode active material per unit area=2.5 mg/cm$^2$
Negative Electrode 3:
Weight of the negative electrode active material per unit area=3.5 mg/cm$^2$
Negative Electrode 5:
Weight of the negative electrode active material per unit area=6.5 mg/cm$^2$ A thickness of the metal lithium located in each cell was adjusted so that the metal lithium was equivalent to 600 mAh/g per the weight of the negative electrode active material.

(Initial Evaluation of Cell)

The thus assembled cells were left to stand for 20 days, and one cell was disassembled. It was confirmed that no metal lithium was remained. From this fact, it was considered that the amount of lithium ion, which was necessary for producing a capacitance not less than 1021 F/g per unit weight of the negative electrode active material, was pre-doped.

(Characteristic Evaluation of Cell)

The cell was charged at a constant current of 1.5 A till the cell voltage reached 3.8 V, and then was charged for one hour by a constant current-constant voltage charging method in which a constant voltage of 3.8 V was applied. Then, the cell was discharged at a constant current of 1.5 A till the cell voltage reached 2.2 V. The cycle of the charging to 3.8 V and the discharging to 2.2 V was repeated, and when the cycle was repeated 10 times, the capacitance and the energy density of each cell were evaluated. Subsequently, the cell was charged in a similar way, and was discharged at a constant current of 60 A till the cell voltage reached 2.2 V. The cell capacitance and its ratio to the capacitance estimated at 1.5 A were evaluated. The results of the evaluation are shown in Table 5. Numerical data in the table are the average values of three cells.

TABLE 5

|  | Cell No. | Capacitance (F) | Energy density (Wh/L) | Capacitance (F) | Capacitance ratio (%) |
|---|---|---|---|---|---|
| Comparative Example 5 | Cell 13 | 501 | 16.6 | 373 | 74.5 |
| Comparative Example 6 | Cell 14 | 535 | 16.9 | 416 | 77.8 |
| Comparative Example 7 | Cell 15 | 586 | 16.0 | 476 | 81.3 |

Each cell of which the positive electrode layer was 121 μm thick (weight of the positive electrode active material per unit area=5.5 mg/cm$^2$) exhibited a low capacitance retention ratio when the cell was discharged at high load, independently of the weight of the negative electrode active material per unit area.

What is claimed is:

1. A lithium-ion capacitor comprising a positive electrode, a negative electrode and an aprotic organic solvent electrolytic solution of a lithium salt as an electrolytic solution, wherein
   a positive electrode active material allows lithium ions and/or anions to be doped thereinto and de-doped therefrom and a negative electrode active material allows lithium ions to be doped thereinto and de-doped therefrom, the positive electrode active material being formed on at least one surface of a current collector so as to form a positive electrode layer,
   at least one of the negative electrode and the positive electrode is pre-doped with lithium ions so that after the positive electrode and the negative electrode are shortcircuited, a potential of the positive electrode is 2 V (relative to Li/Li+) or lower, and
   a thickness of the positive electrode layer of the positive electrode is within a range from 18 to 55 μm when the positive electrode active material is on both surfaces of the current collector and within a range from 9 to 27.5 μm when the positive electrode active material is on only one surface of the current collector,
   wherein the positive electrode active material is an activated carbon,
   wherein the weight of the positive electrode active material per unit area is 1.5 to 4.0 mg/cm$^2$, the weight of the negative electrode active material per unit area is 2.5 to 5.5 mg/cm$^2$ and the negative electrode active material is a polyacene-based organic semiconductor having a polyacene-based skeleton structure which is a heat-treated material of an aromatic condensed polymer and an atomic ratio of hydrogen atom/carbon atom in the polyacene-based organic semiconductor is 0.50 to 0.05.

2. The lithium-ion capacitor according to claim 1, wherein the current collector includes through holes passing through the positive electrode.

3. The lithium-ion capacitor according to claim 2, wherein at least one of the negative electrode and the positive electrode is pre-doped with lithium ions through electrochemical contact of the negative electrode and/or the positive electrode with a lithium ion supply source.

4. The lithium-ion capacitor according to claim 1, wherein the negative electrode active material has a capacitance per unit weight that is at least three times larger than that of the positive electrode active material.

5. The lithium-ion capacitor according to claim 1, wherein the atomic ratio of hydrogen atom/carbon atom in the polyacene-based organic semiconductor is 0.35 to 0.10.

6. The lithium-ion capacitor according to claim 1, wherein the active carbon has a mean particle diameter of between 2 to 8 μm.

7. A lithium-ion capacitor consisting essentially of a positive electrode, a negative electrode and an aprotic organic solvent electrolytic solution of a lithium salt as an electrolytic solution, wherein a positive electrode active material allows lithium ions and/or anions to be doped thereinto and de-doped therefrom and a negative electrode active material allows lithium ions to be doped thereinto and de-doped therefrom, the positive electrode active material being formed on at least one surface of a current collector so as to form a positive electrode layer, at least one of the negative electrode and the positive electrode is pre-doped with lithium ions so that after the positive electrode and the negative electrode are short-circuited, a potential of the positive electrode is 2 V (relative to Li/Li+) or lower, and a thickness of the positive electrode layer of the positive electrode is within a range from 18 to 55 μm when the positive electrode active material is on both surfaces of the current collector and within a range from 9 to 27.5 μm when the positive electrode active material is on only one surface of the current collector, wherein the positive electrode active material is an activated carbon, wherein the weight of the positive electrode active material per unit area is 2.0 to 3.5 mg/cm$^2$, the weight of the negative electrode active material per unit area is 2.5 to 5.5 mg/cm$^2$ and the negative electrode active material is a polyacene-based organic semiconductor having a polyacene-based skeleton structure which is a heat-treated material of an aromatic condensed polymer and an atomic ratio of hydrogen atom/carbon atom in the polyacene-based organic semiconductor is 0.50 to 0.05.

8. The lithium-ion capacitor according to claim 7, wherein the current collector is a stainless steel mesh.

* * * * *